United States Patent Office 3,382,015
Patented May 7, 1968

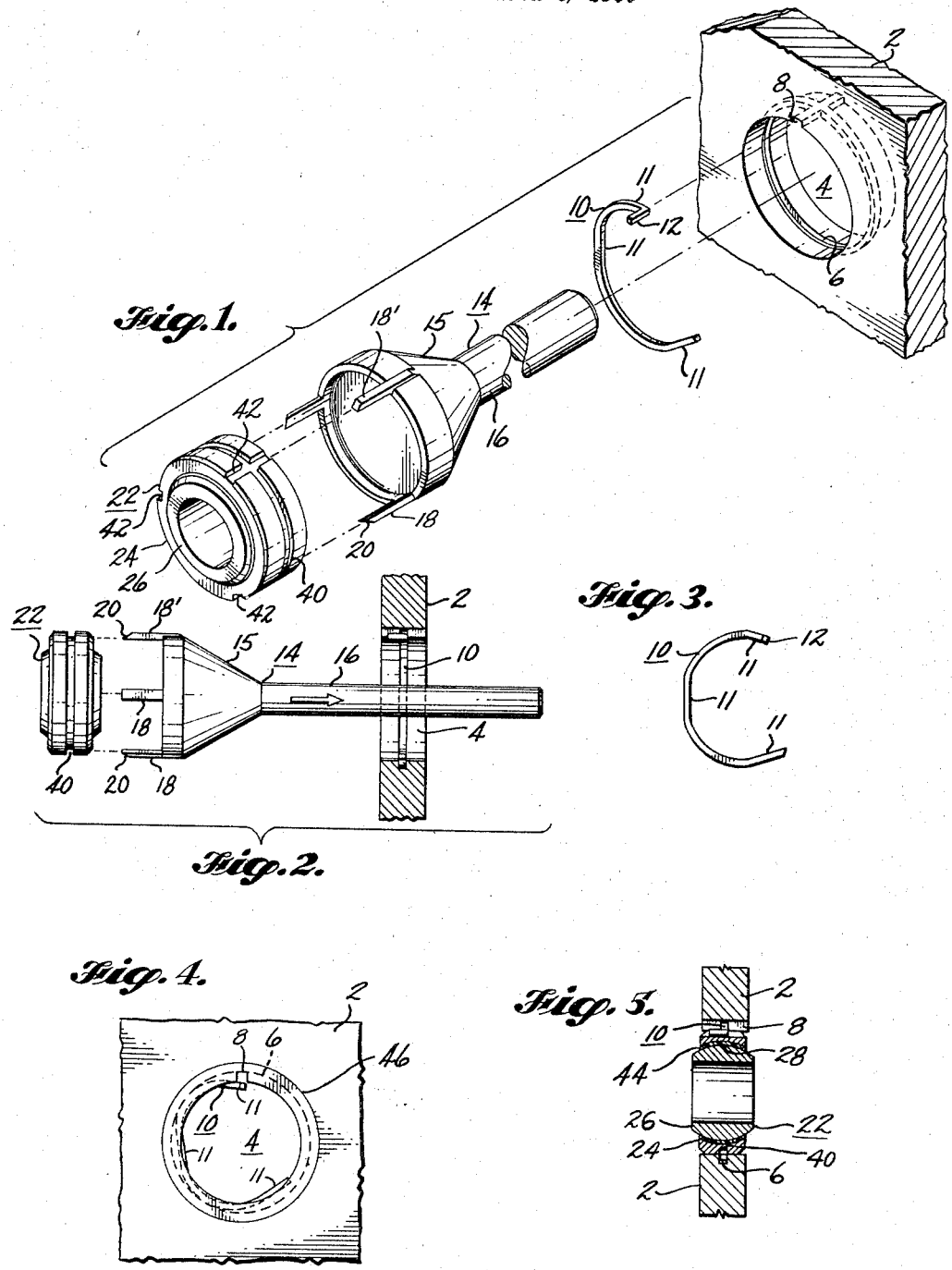

3,382,015
BEARING RETENTION SYSTEM
Robert H. Steidl, 17030 15th St. NW.,
Seattle, Wash. 98177
Filed Mar. 4, 1965, Ser. No. 437,115
11 Claims. (Cl. 308—22)

This invention relates to bearings and installing, retaining and replacing the same.

In an increasing number of industries and in particular the aircraft industry, many applications require bearings. Most of these bearings are retained by friction or by various other methods such as swaging, staking, or bonding. However, these methods are troublesome, uneconomic, and inefficient, for instance; the staked bearing can only be pushed out for replacement and installation of the new bearing requires rework of the hole, new bushing etc. Swaging and bonding have similar drawbacks.

The present invention solves these problems of installing and removing of bearings in an unique way whereby the bearing mounting hole is not damaged and the bearing is locked radially and axially between the outer and inner race and the installation or removal takes only seconds.

It is therefore an object of this invention to provide a bearing which is made up of separable components and which bearing can be installed quickly and easily.

It is another object of this invention to provide a bearing which is provided with means to prevent rotation of the inner and outer race and wherein the forces of rotation occur at the proper surfaces.

It is still another object of this invention to provide a bearing retention system whereby a bearing is locked radially and axially by a retaining ring having flat spots and whereby the flat spots on the retainer ring lock the bearing in place.

Other objects and advantages of this invention will become fully apparent from the following detailed description taken in conjunction with the accompanying drawings which illustrate and clarify the preferred embodiment in which:

FIGURE 1 presents an exploded view in isometric fashion of installing a bearing and its additional components and tool therefor.

FIGURE 2 shows a cross section of the mounting hole and tool during one phase of the installing procedure.

FIGURE 3 shows a plan view of the interrupted snap member or retaining ring.

FIGURE 4 shows a plan view of the mounting hole with the retaining ring therein, and FIGURE 5 is a cross section of the installed bearing.

In general the bearing mounting structure comprises a bore with an annular internal groove and an aperture for preventing rotational movement of a retaining ring or interrupted snap member disposed in the internal groove. The bearing has an annular outer race which contains, for example, a spherically curved internal concave ball socket and this outer race has an outer surface which will fit the bore of the mounting structure. An annular external groove in the outer surface of the outer race will align with the internal groove of the bore of the mounting structure. A plurality of slots are spaced about the outer surface of the outer bearings race or surface which are perpendicular and transverse with respect to the annular external groove. The resilient interrupted snap member or retaining ring disposed in the external and internal grooves when these grooves are in aligned position thus provide an interlocking relationship between the bearing and the mounting structure.

A tool having a plurality of tangs which are located in alignment with the slots about the external surface of the outer race is capable of holding the bearing and expanding the retaining ring or interrupted snap member while installing or removing the bearing in or from its mounting structure. It should be further noted that only the flat spots or straight portions on the retainer ring lock the bearing in place.

Referring now to the drawings wherein like reference characters designate corresponding parts throughout the figures, there is shown in FIGURE 1 an exploded view in isometric fashion of installing a bearing and its additional components. A part of a mounting structure 2 is shown to have a bore 4, which bore has a longitudinal axis, as shown by the dot-dash line and is provided with an annular internal groove 6. Perpendicular to this annular internal groove 6 is an aperture 8.

An interrupted snap member or retainer ring 10 having straight portions 11 and provided with a bent-up portion 12 is shown in alignment with the bore 4.

An inserting tool as well as removing tool 14 is shown with a chamfered shoulder 15 and a handle 16 in alignment with the center line of the bore 4. This tool 14 is provided with a plurality of tangs 18 having chamfered portions 20, for easy insertion into a typical bearing assembly 22. The shoulder 15 of tool 14 is specifically designed for gradually expanding the retainer ring 10 during installation procedure of the bearing assembly 22.

The bearing assembly 22 comprises two main parts, the first being the annular outer bearing or race 24, the second part being the inner ball member 26. The annular shaped outer bearing 24 has a central opening 28 which is shaped inside as a ball socket.

The outer race 24, FIGURE 1, is further provided with an annular external groove 40 and a plurality of slots 42, transverse and perpendicular with the annular groove 40.

In FIGURE 2 is shown the manner of installing of the bearing assembly 22 into the bearing mounting structure 2 by the assistance of the tool 14. The handle 16 of the tool 14 is shown to be inserted in the bore 4 and moved in the direction shown by the arrow. The bearing assembly 22 (shown detached from tangs 18) will be inserted and aligned with the tangs 18 and thus as a complete assembly moved towards the position required for mounting. FIGURE 2 illustrates the mounting structure 2 as a cross section taken along its vertical center axis while the tool 14 with bearing assembly 22 are shown as side view.

In FIGURE 3 is shown the interrupted snap member or retaining ring 10 in its free state. The shape of this snap member 10 when installed in the annular internal groove 6 will be somewhat compressed and its shape will be expanded when the bearing assembly 22 passes through during installation or removal.

FIGURE 4 shows a plan view of the mounting structure 2 and in dashed lines the outline of the annular internal groove 6 as well as the position taken by the interrupted snap member 10 when inserted therein. The bent-up portion 12 of the resilient interrupted snap member 10 is in alignment with the aperture 8.

In FIGURE 5 is shown a cross section of the installed bearing assembly 22 along its vertical center axis. The inner ball member 26 is slideably positioned in the ball socket formed by the central opening or ball socket 28 of the annular outer bearing 24. The ball socket formed by the central opening 28, contains a bonded layer of bearing materials such as Teflon 44 or the like. The annular outer bearing or outer race 24 has its annular external groove 40 in alignment with the annular internal groove 6 of bearing mounting structure 2. The interrupted snap member 10 is shown positioned in the two aforesaid grooves 40 and 6 respectively. Furthermore the bent-up portion 12, FIGURE 3, of the interrupted snap member 10 is shown to be positioned in aperture 8, FIGURE 5, of the bearing mounting structure 2.

In FIGURE 4 is shown a bushing or mounting line 46 which would permit the grooves 6 and 8 to be either in the mounting structure 2 or in a bushing 46.

Having thus indicated the different parts by reference characters, the operation is as follows: Tool 14 is brought in alignment with the bore 4 which is provided with the internal groove 6 and an interrupted snap member 10 installed therein. Referring to FIGURES 1 and 2, tool 14, when pulled into the direction of the arrow as shown in FIGURE 2, will open the snap member 10 and push its straight portions 11 into the internal annular groove 6 by the shoulders 15 and tangs 18 of the tool 14. The bearing assembly 22 which is inserted and aligned with the location of the tangs 18 with respect to the slots 42, moves together with tool 14 into the bore 4 in the direction of the arrow. As shown in FIGURE 4 the straight portions 11 of the snap member 10 which normally protrude out of the annular internal groove 6 are pushed into groove 6 by the chamfered shoulder 15, FIGURE 1, and the tangs 18 of the tool 14. By continuing movement of the tool 14 through the bore 4 of the mounting structure 2, the annular internal groove 6 will line up with the external groove 40.

As soon as the annular internal groove 6, FIGURE 1, is in alignment with the external groove 40 the tool will be removed from the bearing assembly by deserting the tangs 18 from the slots 42, and the snap ring 10 will move into its position shown in FIGURE 4. The bearing assembly 22 is now firmly installed and retained by the action of the snap member 10 holding the bearing assembly 22 into the mounting structure 2. In order to be specific, it should be understood that the installation of the snap member 10 requires first, decompression so that it will pass through bore 4 and then expands itself, thus installing itself. When inserting the bearing assembly 22 the snap member will be expanded first and thereafter return to its installed position. The aperture 8 and one of the slots 42, which may be narrower than the others, are in alignment with one another and kept in alignment by the bent-up portion 12 of the snap ring 10, thus preventing rotation of the assembly 22 in the bore 4 of the mounting structure 2. For removing the bearing assembly 22 the opposite procedure is used: the tool 14 is aligned with its tangs 18 into a substantially perpendicular position with the mounting structure 2. One of the tangs 18 is brought in alignment with the aperture 8 and the tangs are inserted in bore 4 fitting each respective slot 42.

The snap member 10 will be pushed into the expanded position by the tangs 18 and thus relieve any holding action with respect to the outer bearing 24.

Moving the tool in opposite direction or continuing in the same direction of the arrow as shown in FIGURE 2, will move the bearing assembly 22 out of the bearing structure 2, the bearing assembly 22 will be retained through slots 42 in-between the tangs 18 of the tool 14, in perfect alignment. The tool 14 may be designed with a removable handle which allows the tool 14 for usage in cases where space is limited and thus the method of installing as previously described cannot be performed. The tool 14 without handle thus can be inserted from the back side of the bore 4 while the handle will be attached, from the front side, through the bore 4, to the toolhead and the installation proceeds as described before.

For removal of bearing assembly 22, the tool 14 can be inserted as described but rather than pushing on through, the bearing assembly 22 can be backed out by pushing on the bearing assembly 22.

Although various minor structural modifications might be suggested to the preferred embodiment herein described by way of illustrative example only, it should be understood that many changes could be effected to the exemplary structure herein described without departing from the spirit of the present invention, and accordingly, it should be further understood that the inventor wishes to enclose within the scope of the patent warranted hereon all such modifications as reasonably and properly come within the scope of the inventor's contribution to the art.

I claim:

1. A composite self-aligning bearing and mounting installation comprising:
    (a) a bearing assembly having an outer race provided with an annular external groove and a plurality of slots substantially perpendicular with said external groove;
    (b) a mounting structure with a bore having an internal annular groove and an aperture perpendicular to said internal annular groove;
    (c) said bore being of a slightly larger inside diameter than said outer race outer diameter;
    (d) spring means adapted for insertion into said external annular groove and said internal annular groove so that both said grooves are in alignment and said bearing assembly means is retained thereby in said mounting structure, and
    (e) said spring means having a bent-up portion fitting both said slot and said aperture for preventing rotation of said spring means.

2. A composite self-aligning bearing and mounting installation comprising:
    (a) a bearing assembly having an outer race provided with an annular external groove and a plurality of slots substantially perpendicular with said external groove;
    (b) a mounting structure with a bore having an internal annular groove;
    (c) said bore being of a slightly larger inside diameter than said outer race outer diameter;
    (d) spring means adapted for insertion into said external annular groove and said internal annular groove so that both said grooves are in alignment and said bearing assembly means is retained thereby in said mounting structure, and
    (e) said spring means comprising an interrupted snap member having a plurality of straight portions equal to the plurality of said slots and in alignment therewith and wherein said external groove is further provided with an aperture for holding said snap member in permanent position.

3. A bearing installing, retaining and replacing system, comprising:
    (a) a bearing assembly having an outer race provided with an annular external groove and a plurality of slots substantially perpendicular with said external groove and spaced about said outer race;
    (b) a mounting structure having a bore with an internal annular groove and an aperture perpendicular with said internal annular groove,
    (c) said bore being of a larger inside diameter than said outer race outer diameter;
    (d) an interrupted snap member adapted for insertion into said external annular groove and said internal annular groove whereby both said grooves are in alignment and said bearing assembly retained thereby and said snap member provided with a plurality of straight portions in alignment with said slots so that entrance is obtained for expanding said interrupted snap member for installing and removing purposes.

4. A bearing installing, retaining and replacing system as claimed in claim 3 wherein said interrupted snap member is provided with a bent-up portion fitting said aperture for preventing rotation of said snap member along its center axis.

5. A bearing installing, retaining and replacing system as claimed in claim 3 wherein said mounting structure comprises a bushing mounting structure for mounting in an associated bearing mounting structure.

6. A composite bearing and mounting installation comprising:
   (a) a bearing mounting structure containing a bore having a longitudinal axis and with an annular internal groove therein, said bore having an aperture in perpendicular relationship with said annular internal groove therein and parallel to said longitudinal axis of said bore;
   (b) an annular outer bearing having a central opening therein containing a spherically curved internally concave annular surface forming a ball socket;
   (c) said outer bearing having an outer surface fitting said bore of said mounting structure and having an annular external groove therein aligned with said internal groove of said mounting structure, and said outer bearing provided with a plurality of slots spaced about said outer surface and in perpendicular transverse relationship with said annular external groove and parallel to said longitudinal axis of said bore;
   (d) an inner ball member seated in said socket and having a spherically curved convex outer surface fitting the spherically curved concave surface of said socket, and
   (e) a resilient interrupted snap member disposed in said grooves in the aligned position thereof in interlocking relationship with said mounting structure and said outer bearing.

7. A composite bearing and mounting installation as claimed in claim 6 wherein said plurality of slots are substantially equally spaced about said outer surface.

8. A composite bearing and mounting installation comprising:
   (a) a bearing mounting structure containing a bore having a longitudinal axis and with an annular internal groove therein, said bore having an aperture in perpendicular relationship with said annular internal groove therein and parallel to said longitudinal axis of said bore,
   (b) a bearing assembly comprising an outer race and an inner member,
   (c) said outer race having an outer surface fitting said bore of said mounting structure and having an annular external groove therein aligning with said internal groove of said mounting structure, and said outer race provided with a plurality of slots spaced about said outer surface and crossing said external groove at a perpendicular angle and parallel to said longitudinal axis at said bore,
   (d) a resilient interrupted snap member disposed in said grooves in the aligned position thereof in interlocking relationship with said mounting structure and said outer race.

9. A composite bearing and mounting installation as claimed in claim 8 wherein said snap member in its relaxed condition has portions with an external diameter smaller than the internal diameter of said annular internal groove in said bearing mounting structure.

10. A composite bearing and mounting installation according to claim 8 wherein said snap member in its relaxed condition has portions with an internal diameter greater than the internal diameter of said annular external groove in said outer race.

11. A composite bearing and mounting installation according to claim 8 wherein said snap member is provided with a bent-up portion, said bent-up portion adapted to be held in said aperture of said bearing mounting structure whereby rotation of said snap member is prevented.

References Cited

UNITED STATES PATENTS

| | | | |
|---|---|---|---|
| 2,897,022 | 7/1959 | Marola | 308—208 |
| 2,923,580 | 2/1960 | Dwyer | 308—72 |
| 2,987,349 | 6/1961 | Kretzmer | 308—72 |

FOREIGN PATENTS 1,094,168  12/1960  Germany.

MARTIN P. SCHWADRON, *Primary Examiner.*

R. F. HESS, *Assistant Examiner.*